(No Model.) 4 Sheets—Sheet 1.

E. J. J. LENOIR.
GAS ENGINE.

No. 345,596. Patented July 13, 1886.

Witnesses:
David D. Williams,
John E. Parker

Inventor:
Etienne J. J. Lenoir
by his Attorneys:
Howson and Sons (No Model.) 4 Sheets—Sheet 3.

E. J. J. LENOIR.
GAS ENGINE.

No. 345,596. Patented July 13, 1886.

Witnesses:
David S. Williams,
John E. Pawson

Inventor:
Etienne J. J. Lenoir
by his Attorneys
Howson and Sons

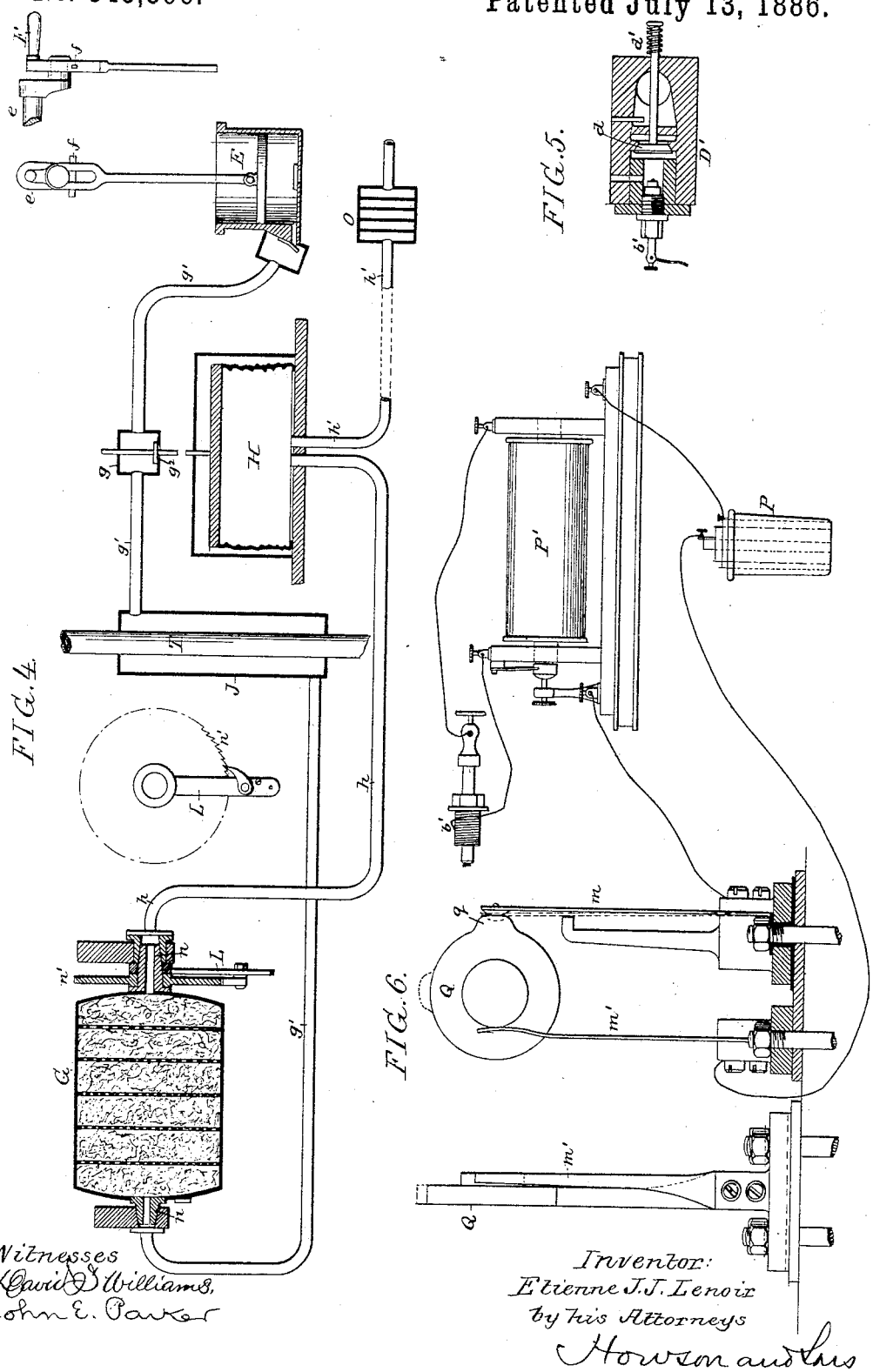

UNITED STATES PATENT OFFICE.

ETIENNE JEAN JOSEPH LENOIR, OF PARIS, FRANCE.

GAS-ENGINE.

SPECIFICATION forming part of Letters Patent No. 345,596, dated July 13, 1886.

Application filed January 6, 1886. Serial No. 187,794. (No model.) Patented in France October 27, 1883, No. 158,259; in England January 15, 1885, No. 610; in Russia January 19, 1885; in Italy January 30, 1885, No. 17,874; in Austria April 3, 1885, No. 2,861, and in Spain April 25, 1885, No. 4,750.

*To all whom it may concern:*

Be it known that I, ETIENNE JEAN JOSEPH LENOIR, a citizen of the Republic of France, and residing in Paris, France, have invented certain Improvements in Gas-Engines, (for which I have obtained certificates of addition dated January 4, 1884, and July 12, 1884, to the French Patent No. 158,259, dated October 27, 1883; British Patent No. 610, dated January 15, 1885; Italian Patent No. 17,874, dated January 30, 1885; Austrian Patent No. 2,861, dated April 3, 1885; Spanish Patent No. 4,750, dated April 25, 1885, and Russian Patent dated January 19, 1885,) of which the following is a specification.

My invention consists of certain improvements in the construction of gas-engines, more particularly for use for agricultural and similar purposes, although many of the present improvements are applicable to gas-engines for various other uses.

Figure 1:
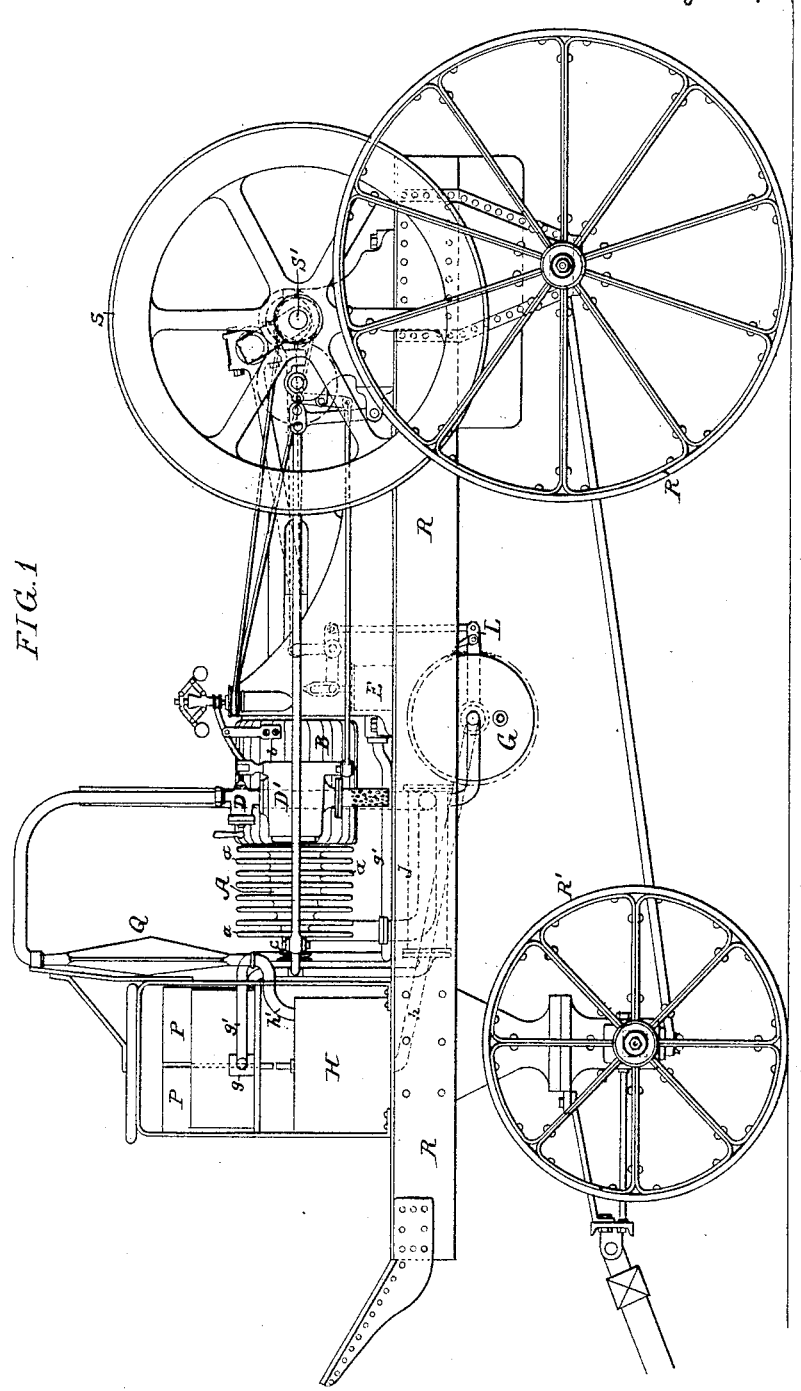
Figure 2:
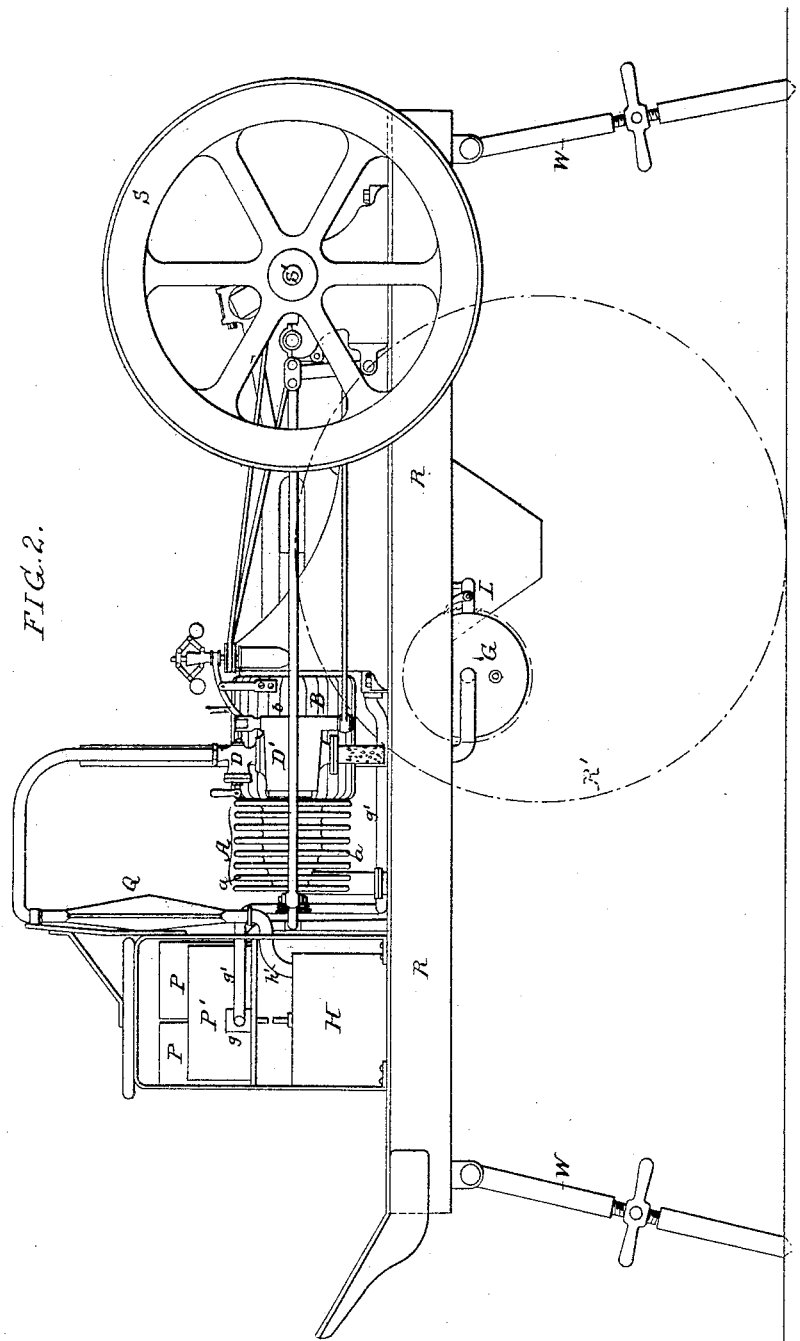
Figure 3:
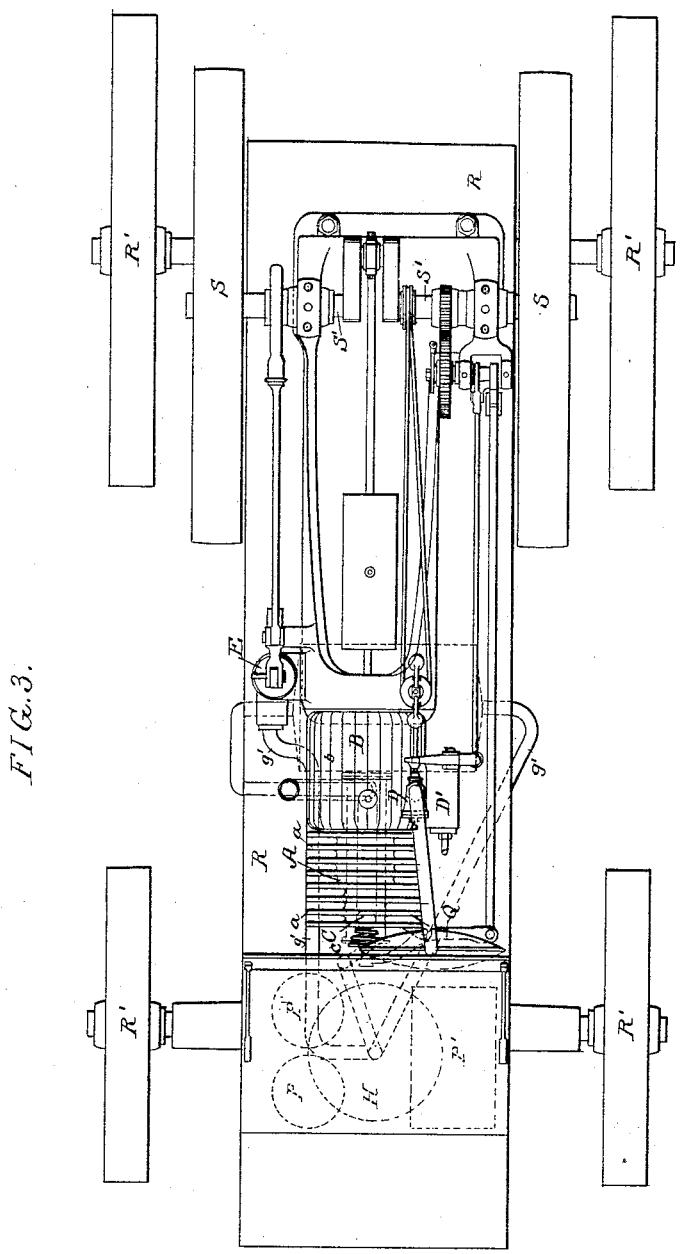

In the accompanying drawings, Figure 1 is a side view of my improved gas-engine, and its appliances mounted on a portable carriage for agricultural and similar purposes. Fig. 2 is a similar side view, illustrating the portable carriage as supported by braces. Fig. 3 is a plan view corresponding with Fig. 1. Fig. 4 is a sectional diagram illustrating the air-carbureting devices which may be used. Fig. 5 is a sectional plan view of the inlet-valve and igniting devices for the cylinder of the gas-engine, and Fig. 6 is a view illustrating the electrical appliances for producing the ignition of the gaseous mixture.

The gas-engine itself resembles in many of its features that for which I obtained a patent February 2, 1886, No. 335,462.

In Figs. 1, 2, and 3 I have shown this engine as mounted on a traveling carriage, R, so that it may be moved around from place to place to provide power for agricultural and other purposes where a portable engine is desired, and in order to make the apparatus complete in itself, I mount on the carriage, in connection with the engine, the air-carbureting devices and electrical gas-igniting appliances, as described hereinafter.

In the construction shown in Figs. 1 and 3 the carriage is shown as mounted on four wheels, R', while in the construction shown in Fig. 2 I have illustrated a two-wheeled vehicle which is to be supported by adjustable struts W, when the carriage is brought to the desired position for use.

As described in my aforesaid Patent No. 335,462, the engine proper comprises a motor-cylinder, B, with a combustion chamber, A, at the end thereof, the piston being adapted to move in the motor-cylinder B. The piston is connected by the usual rods to the crank-shaft S', which carries fly-wheels S, from which the power may be transmitted in any convenient way. At the side of the motor-cylinder B is the valve-chest D', for the supply of air and gas and for the ignition of the mixture; but the valve for the admission of the mixture into the cylinder, instead of being mechanically operated from the crank-shaft of the engine, is adapted to be operated, as hereinafter described, by the exhausting action due to the movement of the piston.

The combustion chamber A, I prefer to separate from the motor-cylinder B by a non-conducting material in such a manner that the temperature of this chamber may be raised to from about 300° to 400° centigrade, while that of the cylinder B is maintained as low as 100°. The explosive mixture is introduced directly into the cylinder B without first passing to the combustion-chamber. This mixture is afterward compressed by the piston in the chamber A, where it becomes highly heated before the ignition, which takes place gradually, beginning from the surface of the piston and extending toward the end of the chamber A. The latter thus receives the principal calorific effects of the combustion.

In order to disperse or throw off the intense heat generated in the chamber A, I provide the external surface of this chamber with ribs or projections *a*. In the drawings I have illustrated these ribs or projections as circumferentially arranged at right angles to the axis of the chamber; but they may, if preferred, be arranged in any other convenient way. The cylinder B may also be provided with external ribs, b, for the same purpose, and in the drawings I have shown these ribs as arranged longitudinally.

At the rear end of the combustion-chamber A is an outlet-valve, C, which may be similar to that in my above-described patent, and mechanically operated by the devices therein described. By means of this valve a thorough and regular expulsion of the products of combustion may be obtained. A helical or coiled spring, c, Fig. 3, maintains the valve closed after each discharge.

The construction of the inlet-valve d is more fully illustrated in Fig. 5, from which it will be seen that the valve d is automatic, being normally kept to its seat by a spring, d', and being opened by the above-described exhausting action of the piston after each discharge of the products of combustion.

Within the chamber of the valve-chest D', adjacent to the port opening into the cylinder, are provided electrical igniting-points b.

The devices I prefer to use for producing the sparks at intervals are illustrated in the diagram Fig. 6, P being the battery, P' the induction-coil, and Q the commutator, with which are combined two contact-brushes, $mm'$, connected up in circuit. The contact-brush $m'$ is always in contact with the cylindrical portion of the commutator Q, to which a rotary motion is imparted by any suitable means, while a projection, q, on the commutator makes contact with the brush m to complete the circuit at each revolution of the commutator. By combining this commutator with the induction-coil, explosions at the proper moment only are insured, and the battery is thrown out of action between times. By employing one or several circuit making and breaking devices on the commutator the ordinary vibrating hammer of the induction-coil may be dispensed with. The battery and coil may be placed under the driver's seat at P and P', as found convenient, Figs. 1, 2, and 3.

The engine above described may be operated by illuminating-gas in any ordinary way; but I prefer, more especially when the apparatus is made portable, as before set forth, to provide air-curbureting devices. For this purpose I employ the devices illustrated more clearly in Fig. 4.

E is an air-pump, the piston of which is operated from some moving part of the engine. The cylinder of this pump communicates through a pipe, g', with a heater, J, and thence through a pipe, g, with the carburetor G. This carburetor consist of a cylinder provided at opposite ends with hollow journals n, adapted to suitable bearings. The interior of the cylinder is provided with a series of perforated diaphragms and intermediate layers of sponge or similar absorbent material, and contains a hydrocarbon liquid. On one of the journals of the cylinder is mounted a ratchet-wheel, n', with which engages a pawl on an arm, L, Figs. 1 and 2. To this a vibrating motion is imparted from some moving part of the engine to impart a slow rotary motion to the cylinder to keep the sponge uniformly saturated with the hydrocarbon liquid, so that the air will also be uniformly saturated as it passes through the cylinder from the pipe J to the exit-pipe h and reservoir H. From thence the carbureted air passes through the tubes h' to the gas-bag Q, Figs. 1 and 2, and thence to the gas-valve D, above the valve-chest D'. I prefer, however, to interpose between the gas-reservoir and the valve-chest a casing, O, containing wire-gauze diaphragms, to prevent the ignition from extending back into the gas-reservoir. The air passing through the heater J may receive its heat from the escape or exhaust pipe T, for the products of combustion from the engine, this escape-pipe passing centrally through the heater J. This preliminary heating of the air facilitates the more thorough saturation thereof with the hydrocarbon.

In order that the quantity of air supplied to the carburetor may always be in proportion to the quantity of gas consumed, I provide, in connection with the air-supply pipe, an automatic regulator, g. This consists of a chamber having at its lower end an opening normally closed by a valve, $g^2$, with a downwardly-projecting stem, which is adapted to be struck, to raise the valve from its seat, by a projection on the movable diaphragm of the gas-reservoir H, when the latter is raised beyond its normal height by the pressure of gas therein, so that there will be an escape of air from the supply-pipe until the supply of gas in the reservoir is diminished below the normal quantity.

In order to permit the pump E to be operated by hand in starting the engine, I provide the upper end of the piston-rod with a handle, F, so that after the cotter-pin f has been withdrawn to free the rod from its crank e, the piston may be operated by hand, but may be connected to the crank e again by returning the cotter-pin f to its place.

The gas-supply valve D may be controlled by governing devices similar to those set forth in the patent granted to me, No. 335,462, and which will therefore not need to be described here.

I claim as my invention—

1. The combination of a gas-engine with an air-supply pipe having an escape-valve, a carbureting-chamber, and a gas-reservoir provided with a movable diaphragm adapted to open the escape-valve when the supply of gas is unduly increased, substantially as and for the purpose described.

2. The combination of a gas-engine with an air-supply pipe, and a rotary carburetingcylinder, G, containing hydrocarbon liquid and absorbent material, substantially as specified.

3. The combination of a gas-engine, and air and gas supplied therefor, with electrical igniting devices, comprising a battery, induction-coil, commutator, and commutator-brushes to close the circuit, substantially as described.

In testimony whereof I have signed my name to this specification in the presence of two subscribing witnesses.

ETIENNE JEAN JOSEPH LENOIR.

Witnesses:
  LÉON FRANCKENE,
  ROBT. M. HOOPER.